(12) United States Patent
Paul et al.

(10) Patent No.: US 8,554,686 B2
(45) Date of Patent: Oct. 8, 2013

(54) ANTI-HACK PROTECTION TO RESTRICT INSTALLATION OF OPERATING SYSTEMS AND OTHER SOFTWARE

(75) Inventors: Stephen Paul, Superior, CO (US); Steven Goodrich, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2543 days.

(21) Appl. No.: 11/172,547

(22) Filed: Jun. 30, 2005

(65) Prior Publication Data

US 2007/0006320 A1 Jan. 4, 2007

(51) Int. Cl.
- *G06F 21/00* (2013.01)
- *G06F 12/14* (2006.01)
- *G06F 9/445* (2006.01)
- *G06Q 20/40* (2012.01)
- *G06F 21/12* (2013.01)

(52) U.S. Cl.
CPC .......... *G06Q 20/40* (2013.01); *G06Q 2220/145* (2013.01); *G06F 21/123* (2013.01)
USPC .................. 705/56; 705/51; 705/55; 726/23; 726/27; 717/174

(58) Field of Classification Search
USPC ........................................ 726/27; 705/50–79
See application file for complete search history.

(56) References Cited

U.S. PATENT DOCUMENTS

| | | | | |
|---|---|---|---|---|
| 3,996,449 A * | 12/1976 | Attanasio et al. | ............. | 235/431 |
| 5,210,875 A * | 5/1993 | Bealkowski et al. | ............. | 713/2 |
| 5,564,054 A * | 10/1996 | Bramnick et al. | ................ | 713/2 |
| 5,651,139 A | 7/1997 | Cripe et al. | .................... | 395/490 |
| 5,787,491 A | 7/1998 | Merkin et al. | ................ | 711/173 |
| 5,796,839 A * | 8/1998 | Ishiguro | ........................... | 380/44 |
| 5,822,582 A | 10/1998 | Doragh et al. | ................ | 395/652 |
| 5,937,063 A | 8/1999 | Davis | | |
| 5,974,474 A * | 10/1999 | Furner et al. | ...................... | 710/8 |
| 5,974,517 A | 10/1999 | Gaudet | ......................... | 711/173 |
| 6,161,178 A | 12/2000 | Cromer et al. | | |
| 6,263,431 B1 * | 7/2001 | Lovelace et al. | .................. | 713/2 |
| 6,298,443 B1 | 10/2001 | Colligan et al. | ............. | 713/200 |

(Continued)

FOREIGN PATENT DOCUMENTS

| | | |
|---|---|---|
| DE | 4315732 C1 | 6/1994 |
| JP | 10333902 A | 12/1998 |

(Continued)

OTHER PUBLICATIONS

AMD Geode GX 533@1.1W Processor* Technical Specs, http://www.amd.com/us-en/ConnectivitySolutions/ProductInformation/0,,50_2330_9863_9864,00.html, printed Oct. 6, 2005.

(Continued)

*Primary Examiner* — Calvin L Hewitt, II
*Assistant Examiner* — Mohammad A Nilforoush
(74) *Attorney, Agent, or Firm* — Terrile, Cannatti, Chambers & Holland, LLP; Michael Rocco Cannatti

(57) ABSTRACT

In a personal Internet communication device, a security key is stored on the master boot record. Any bootable device attempting to write operating system files or software files must have an authorized signature key in order to be eligible to install files on the personal Internet communication device.

8 Claims, 6 Drawing Sheets

(56) References Cited

U.S. PATENT DOCUMENTS

| | | | |
|---|---|---|---|
| 6,327,652 B1* | 12/2001 | England et al. | 713/2 |
| 6,381,694 B1* | 4/2002 | Yen | 713/2 |
| 6,754,895 B1 | 6/2004 | Bartel et al. | 717/171 |
| 6,832,317 B1 | 12/2004 | Strongin et al. | 713/182 |
| 7,506,378 B2* | 3/2009 | Saito et al. | 726/26 |
| 7,536,598 B2* | 5/2009 | Largman et al. | 714/36 |
| 2002/0087877 A1* | 7/2002 | Grawrock | 713/200 |
| 2002/0152394 A1 | 10/2002 | Kadoya | |
| 2002/0166072 A1 | 11/2002 | Cromer et al. | |
| 2003/0084278 A1 | 5/2003 | Cromer et al. | 713/2 |
| 2003/0084307 A1* | 5/2003 | Schwartz | 713/189 |
| 2003/0084316 A1* | 5/2003 | Schwartz | 713/200 |
| 2003/0221115 A1 | 11/2003 | Itoh et al. | |
| 2004/0056090 A1 | 3/2004 | Saito et al. | |
| 2004/0088697 A1* | 5/2004 | Schwartz et al. | 717/174 |
| 2005/0132357 A1 | 6/2005 | Shell et al. | |

FOREIGN PATENT DOCUMENTS

| | | |
|---|---|---|
| JP | 2002271254 A | 9/2002 |
| JP | 2002-108484 | 10/2002 |
| JP | 2003-005859 | 1/2003 |
| JP | 2004-046327 | 2/2004 |
| WO | WO 03/029965 | 4/2003 |
| WO | 03/060679 A1 | 7/2003 |
| WO | WO2006017774 A2 | 2/2006 |

OTHER PUBLICATIONS

"AMD Personal Internet Communication (PIC)—Specification," http://www.amdboard.com/pic.html, printed Oct. 6, 2005.

International Search Report for PCT/US2006/024766, mailed Oct. 26, 2006.

Office Action for Chinese Patent Application No. 200680023964l.1 and translation dated Feb. 6, 2009.

Translation of Office Action for German Patent Application No. 112006001744.6 dated Sep. 10, 2008.

Translation of Office Action for German Patent Application No. 112006001744.6 dated Aug. 10, 2009.

T. Perley et al., "An Overview of the Design of the AMD Personal Internet Communicator," submitted for publication at 2005 Technical, Professional and Student (TPS) Development Conference (Apr. 2005).

Office Action for Chinese Patent Application No. 200680023964l.1 and translation dated Aug. 7, 2009.

Examination Report for UK Patent Application No. 0800920.1 dated Oct. 26, 2009.

Translation of Office Action for German Patent Application No. 112006001744.6 dated Mar. 4, 2010.

English Abstract for DE 4315732C1, published Jun. 1, 1994.

Office Action for JP Patent Application No. 2008-519447, dated Dec. 19, 2011.

Office Action for JP Patent Application No. 2008-519447, dated Aug. 1, 2012.

* cited by examiner

ANTI-HACK PROTECTION TO RESTRICT INSTALLATION OF OPERATING SYSTEMS AND OTHER SOFTWARE

BACKGROUND OF THE INVENTION

1. Field of the Invention

The present invention relates to the field of information processing systems. In one aspect, the present invention relates to a system and method for ensuring a secure computing environment for computer systems used to communicate over the Internet.

2. Description of the Related Art

Computer systems have attained widespread use for providing information management capability to many segments of today's society. A personal computer system can usually be defined as a microcomputer that includes a system unit having a system processor and associated volatile and non-volatile memory, a display monitor, a keyboard, a fixed disk storage device, an optional removable storage device and an optional printer. These personal computer systems are information processing systems which are designed primarily to give independent computing power to a single user (or a group of users in the case of personal computers which serve as computer server systems) and are inexpensively priced for purchase by individuals or small businesses.

In recent years, there has been significant growth in the use of the personal computers to exchange information over the Internet. This exchange of information is based on a client/server model with the user's personal computer operating as the client to access data stored on a plurality of Internet servers. Some Internet service providers provide a computer to a user as part of a contractual relationship to provide Internet service. As part of the relationship, the Internet service provider may occasionally need to provide software packages to the computer relating to software upgrades and software that provides additional services. In addition, users may also attempt to download computer programs from the Internet or to install programs locally from sources that may not be secure.

Consequently, there is a need for a safeguard process that prevents users from installing unauthorized software that may adversely affect the operation of the computer and/or interfere with authorized software provided by the Internet service provider. In addition, a significant need exists for preserving the integrity of the operating system and the applications stored on computers, such as those used as personal Internet communicators (PICs) over a communication network provided by an Internet service provider. Further limitations and disadvantages of conventional systems will become apparent to one of skill in the art after reviewing the remainder of the present application with reference to the drawings and detailed description which follow.

SUMMARY OF THE INVENTION

The method and apparatus of the present invention provides a reliable and secure computing environment for a personal Internet communicator. In one embodiment, the present invention can be used to restrict the installation of operating system and/or software code on the personal Internet communicator by storing a key in the non-volatile storage of the personal Internet communicator, such as the master boot record, and requiring any bootable device to have a matching signature or key in order to be eligible to have operating system files or application files written.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

Figure 1:
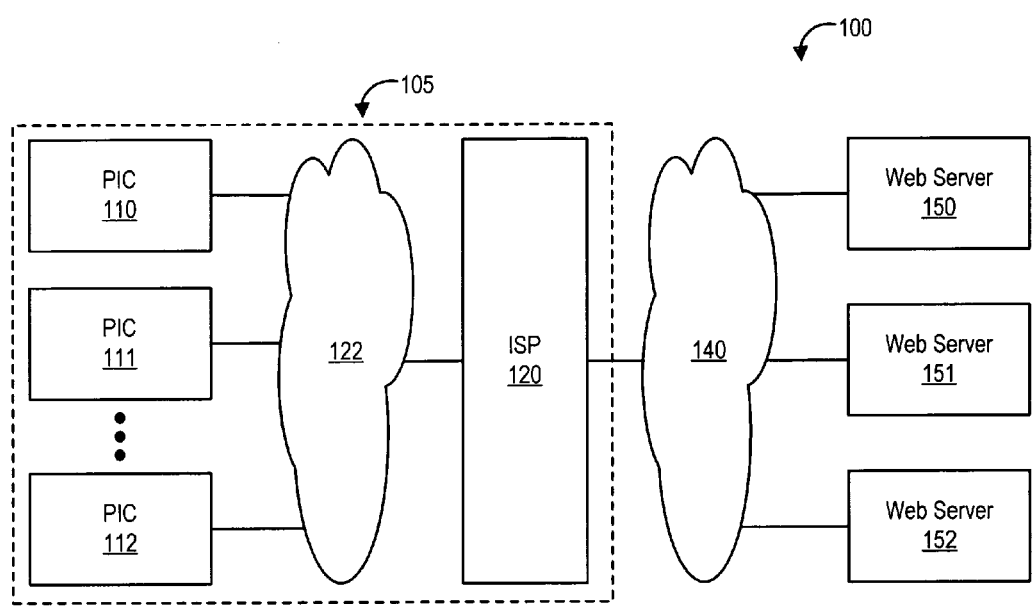
FIG. 1 is a block diagram of a plurality of computer systems communicating over one or more communication networks.

Referring to FIG. 1, a block diagram of an exemplary network 100 is shown wherein a plurality 105 of computer systems 110, 111, 112 communicates over one or more communication networks 140. As illustrated, each computer system (e.g., 110)—also referred to as a multimedia access devices or personal Internet communicators (PICs)—is operably coupled to an Internet service provider (ISP) 120 via one or more communication links 122. The Internet service provider 120 is coupled to the Internet 140 that is further coupled to a plurality of Web host servers 150, 151, 152. A user wishing to access information on the Internet uses a PIC (e.g., 110) to execute an application program stored on the PIC known as a Web browser.

The PIC 110 includes communication hardware and software that allows the PIC 110 to send and receive communications to and from the Internet service provider 120. The communications hardware and software allows the PIC 110 to establish a communication link with the Internet service provider 120. The communication link may be any of a variety of connection types including a wired connection, a direct link such as a digital subscriber line (DSL), T1, integrated services digital network (ISDN) or cable connection, a wireless connection via a cellular or satellite network, phone modem dialup access or a local data transport system, such as Ethernet or token ring over a local area network.

When the customer enters a request for information by entering commands in the Web browser, the PIC 110 sends a request for information, such as a search for documents pertaining to a specified topic, or a specific Web page to the Internet service provider 120 which in turn forwards the request to an appropriate Web host server 150 via the Internet 140. The Internet service provider 120 executes software for receiving and reading requests sent from the browser. The Internet service provider 120 executes a Web server application program that monitors requests, services requests for the information on that particular Web server, and transmits the information to the user's PIC 110.

Each Web host server 150, 151, 152 on the Internet has a known address that the user supplies to the Web browser to connect to the appropriate Web host server. If the information is not available on the user's Web host server 150, the Internet 140 serves as a central link that allows Web servers 150, 151, 152 to communicate with one another to supply the requested information. Because Web servers 150, 151, 152 can contain more than one Web page, the user will also specify in the address which particular Web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 2:
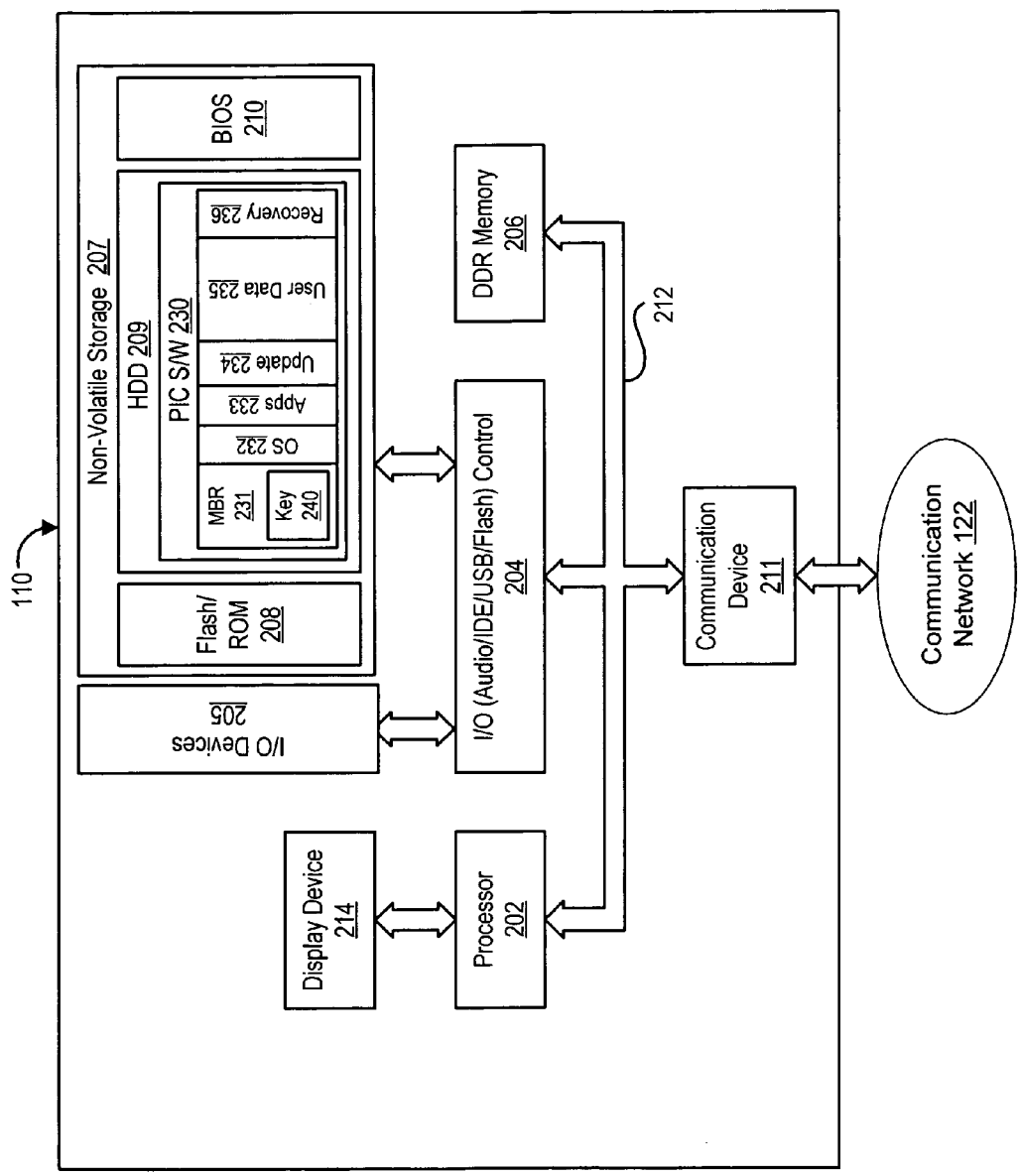
FIG. 2 is a system block diagram of a computer system, such as a personal Internet communicator, in accordance with various embodiments of the present invention.

Referring to FIG. 2, a block diagram of PIC 110 is shown. The PIC 110 includes a processor 202, input/output (I/O) control device 204, memory (including volatile random access memory (RAM) memory 206 and non-volatile memory 207), communication device 211 (such as a modem) and a display 214. The processor 202, I/O controller 204, memory 206 and communication device 211 are interconnected via one or more buses 212. In a selected embodiment, the processor 202 is implemented as an AMD Geode GX 32-bit x86 compatible processor, the memory 206 is implemented as a 128 MB DDR memory and the display 214 is implemented as a CRT monitor. In addition, the non-volatile memory 207 may include a hard disk drive 209 that is implemented as an integrated 3.5 inch hard disk drive with a minimum capacity of, e.g., 10 GB. Either or both of the memories 206, 207 may be integrated with or external to the PIC 110. As for the communication device 211, an integrated 56K ITU v. 92 Modem with an external connector may be used to support different phone systems throughout the world, though other modems (e.g., a soft modem) may also be used. Of course, it will be appreciated that other device configurations may also be used for the processor 202, memory 206, 207, display 214 and communication device 211. For clarity and ease of understanding, not all of the elements making up the PIC 110 are described in detail. Such details are well known to those of ordinary skill in the art, and may vary based on the particular computer vendor and microprocessor type. Moreover, the PIC 110 may include other buses, devices, and/or subsystems, depending on the implementation desired. For example, the PIC 110 may include caches, modems, parallel or serial interfaces, SCSI interfaces, network interface cards, and the like.

As illustrated in FIG. 2, the I/O control device 204 is coupled to I/O devices 205, such as one or more USB ports, a keyboard, a mouse, audio speakers, etc. The I/O control device 204 is also coupled to non-volatile storage 207, such as a flash memory or other read only memory (ROM) 208 and/or hard disk drive 209. The PIC 110 is depicted as being connected to communication network 122 and the Internet 140 by a communication device 211, such as a modem, but the connection may be established by any desired network communication device known to those of skill in the art. Though the processor 202 is shown as being coupled directly to a display device 214, the processor may also be coupled indirectly to the display 214 through a display or I/O controller device. Similarly, the processor is shown as being coupled through the I/O controller 204 to the non-volatile memory 207, though direct coupling is also contemplated.

Various programming codes and software are stored in the PIC memory. For example, the basic input/output system (BIOS) code that starts the PIC 110 at startup may be stored in a BIOS ROM device 210 of the non-volatile storage 207, such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The BIOS/Bootloader 210 is essentially invisible to the user and includes a compatible bootloader to enable the PIC operating system to be an embedded closed operating system, such as a Windows CE type operating system, though any operating system (including but not limited to Windows-based and Linux-based Operating Systems) could be supported by the BIOS code. The BIOS/Bootloader 210 is essentially invisible to the user and boots to the operating system.

PIC software 230 and user data may also be stored on the hard drive 209 of the non-volatile storage 207 and executed and/or processed by processor 202. The PIC software 230 may include a master boot record (MBR) 231, an operating system 232, an application program partition 233, a software update module 234, user data 235, and a hidden image recovery module 236. The MBR 231 is a small program that is executed when the PIC 110 boots up, and typically resides on the first sector of the hard disk 209. In addition, the MBR 209 may contain a table of partitions on the disk. As for the operating system, several uniquely configurable operating parameters that can affect the performance of the system are pre-configured as part of the software 230 when it is initially installed on the drive 209. The software 230 also includes application programs 233 that are needed for the PIC 110 to function as specified. For example, the applications 233 may include web browser, Flash player, presentation viewer for PowerPoint, chat, game, compression utility, e-mail, word processor, spreadsheet, PDF viewer, media player and/or drawing applications. In addition, the user data 235 stores all of the user's data so that a user has direct access to the user data. This user data is protected from the rest of the operating system to prevent corruption of the data by a virus or other means.

In a selected embodiment, the PIC 110 is protected against unauthorized installations by configuring the PIC software 230 so that applications are added or updated only from boot loader devices that have a predetermined authorization or security key. An example of such a boot loader device is a USB-connected flash storage device. In an example implementation, the installation restriction is controlled by the software update module 234 which only allows installations from boot devices having a key that matches a locally stored installation key, such as a unique security key 240 that is stored in the non-volatile memory 207. The unique security key 240 may be unique for each PIC 110, 111, 112, or may instead shared among the PICS to collectively control installation access from a single source (e.g., ISP 120). In a selected embodiment, the unique security key 240 is stored in the master boot record 231 of the hard drive 209, although it may also be stored in the flash memory or other ROM 208 or on a hardwired integrated circuit. Thus, before any operating system files or application files are transferred from the bootable device, the update module 234 must determine that the boot device has a signature or key that matches or otherwise corresponds to the unique security key 240. In this way, the unique security key 240 can be used to protect the integrity of the operating system on the PIC 110 by restricting installation of operating system code or other software to bootable devices that have a matching security key.

Figure 3:
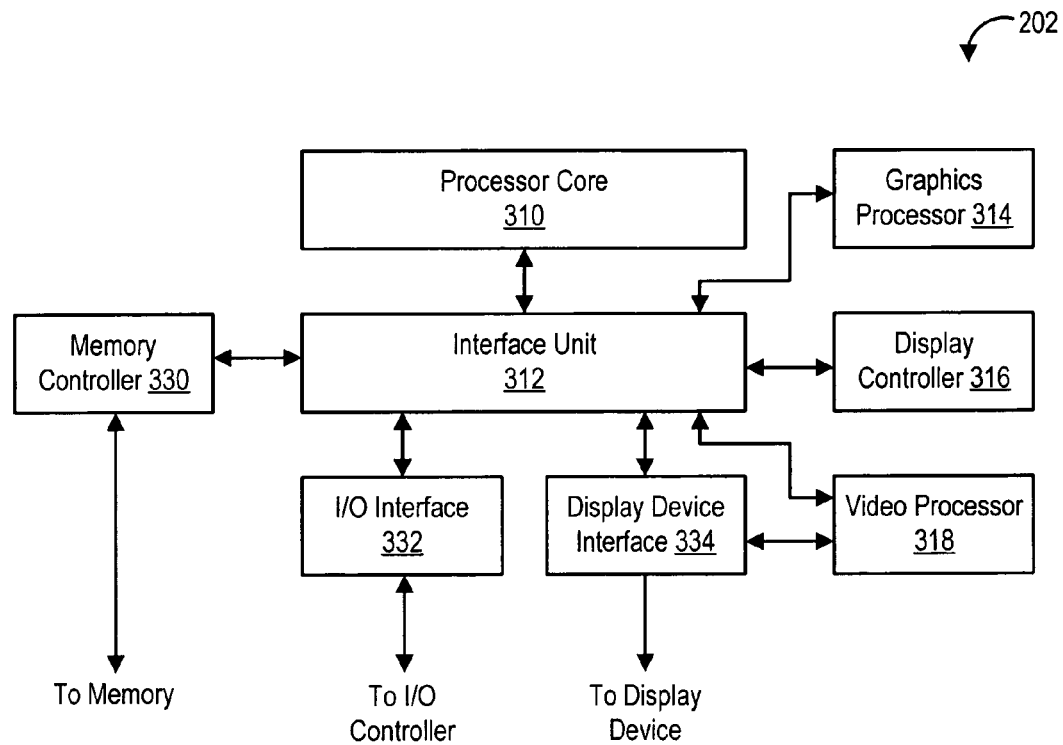
FIG. 3 shows a block diagram of a processor system for use in the personal Internet communicator.

Referring to FIG. 3, a block diagram of the processor 202 is shown. In one embodiment, the processor 202 is a Geode GX2 processor available from Advanced Micro Devices. The processor 202 includes a processor core 310, a bus or interface unit 312, a graphics processor 314, a display controller 316, and a video processor 318. The processor 202 also includes a memory controller 330, an I/O controller interface 332 and a display device interface 334, though it will be appreciated that these controllers and interfaces may be implemented externally to the processor 202. In the illustrated embodiment, the processor 202 executes software stored in the memory 206, 207 to restrict installation of operating systems and other software from boot devices that do not include an authorized signature that matches or corresponds to the unique security key 240.

Figure 4:
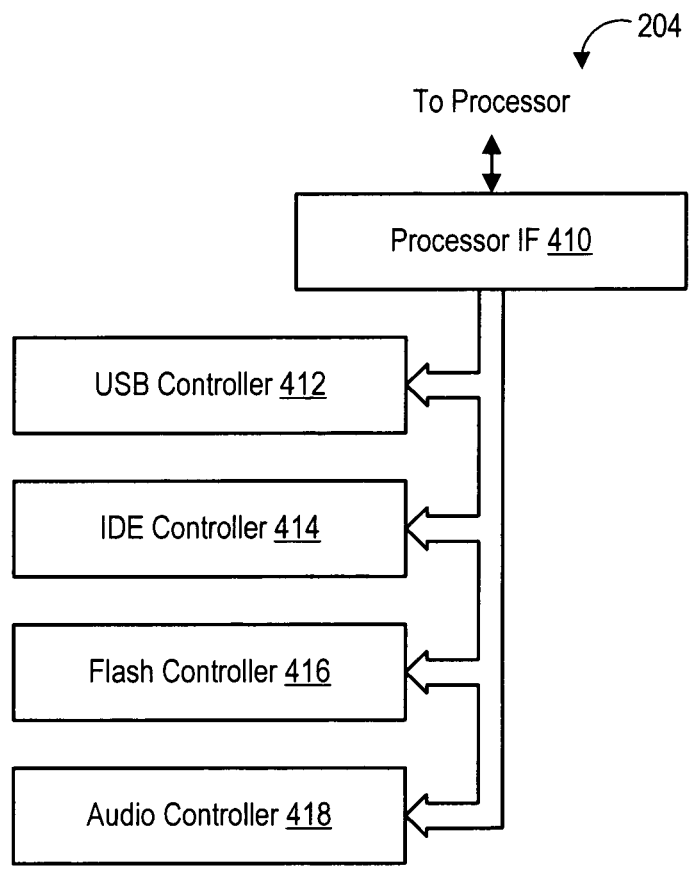
FIG. 4 shows a block diagram of an input output (I/O) system for use in the multipurpose media access device.

Referring to FIG. 4, a block diagram of the I/O control device 204 is shown. In one embodiment, the I/O control device is a Geode CS5535 I/O Companion Device available from Advanced Micro Devices. The I/O control device 204 includes a processor interface module 410, a USB controller module 412, an IDE controller module 414, a Flash memory controller module 416, an Audio controller module 418 and a system power management module 420. In accordance with various embodiments of the present invention, the USB controller module 412 or flash memory controller module 416 are used to interface with a USB-connected flash storage device that is used as a bootable device to load software, such as operating system or application software.

To protect system integrity of the operating system and other applications, the PIC 110 is designed to limit the installation of additional software. For example, the PIC 110 may optionally be designed so that there is no floppy disk or CD-ROM drive included or supported, which would be the normal method for installing software and device driver packages. System integrity is further protected by disabling the USB keyboard and mouse until the operating system is loaded, making it very difficult to install anything even the PIC 110 could be booted from a different source. In addition, software installation may be disabled on the operating system and applications installed as part of the PIC software 230, except through use of the software update module 234 which disables software load or boot activity from any USB device that does not have an authorized signature key that matches the unique security key 240.

Figure 5:
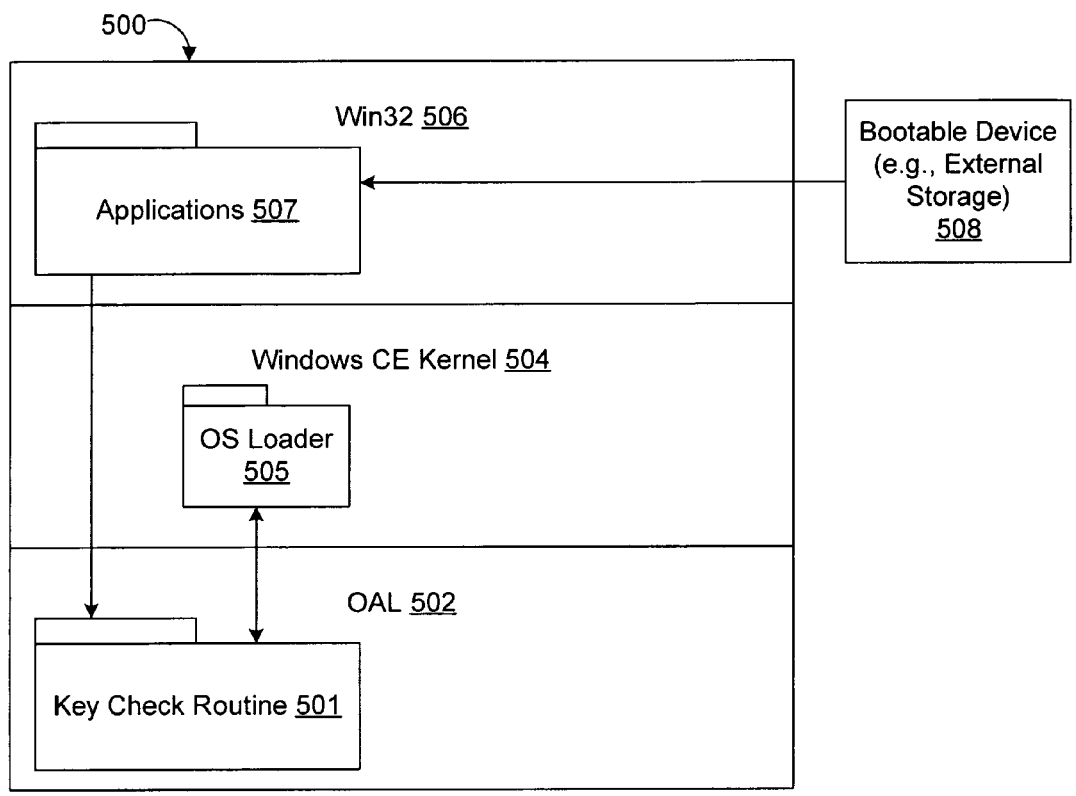
FIG. 5 depicts an example of a software update module that is used to restrict software installation.

FIG. 5 depicts an example of a software update module 500 that is used to restrict software installation. In the depicted example, a Windows CE implementation of the software update module 500 has several different layers that work together, including an OEM adaptation layer (OAL) component 502, a Windows CE kernel component layer 504 and a Win32 component layer 506. The OAL component 502 includes platform-specific interfaces (such as timers, clocks and interrupts), and connects to the basic operating system launch mechanism 505 in the Windows CE kernel component 504. The Windows CE kernel component layer 504 is abstracted away from the hardware by the OAL layer, and provides a generic communications mechanism between the OAL component 502 and the Win32 layer 506. The Win32 component layer 506 resides above the OAL and kernel layers 502, 504, and is the basic environment for applications 507. As will be appreciated, the operating system launch mechanism 505 may be implemented as part of the OS that loads applications, but may also be implemented as the program that loads WinCE into memory to start it running, in which case it may be included in the BIOS/BootLoader Each time the user or OS wants to launch an application or load a library (DLL) from an external storage device 508, the kernel component 504 checks with the OAL component 502 to confirm that the application or module should be launched. A key check routine 501 in the OAL component 502 confirms launch if an authorization key associated with the application or module matches a locally stored security key. The key check routine 501 can be accomplished in a variety of ways. For example, Windows CE provides a certification mechanism that can be leveraged to protect the PIC 110 by implementing security measures to prevent the OS from loading unknown modules, to restrict access to system application programming interfaces (APIs) and/or to prevent write access to parts of the system registry. In the course of certifying applications, a module can be designated as trusted or not trusted, and the kernel component 504 can use this information to prevent unauthorized applications from loading or to limit their access to the system. For example, before the kernel component 504 loads an application, a certification function in the OAL component 502 verifies the application signature, such as by comparing the application signature to the locally stored security key. With this approach, a Windows CE-based run-time images loads an application only if it contains a valid digital signature.

In addition, the integrity of the operating system may also be protected by including a limited set of BIOS firmware instructions to limit the installation of unauthorized operating systems. At system turn on, the limited BIOS firmware looks for an installation key, such as a unique security key 240, in the hard drive 209 or any other boot device (e.g., a USB-connected flash storage device or CD-ROM). If the installation key is not present, then system turn on is aborted, but if the installation key is present, then system turn on proceeds. In this way, the hard drive 209 is protected against replacing the original operating system (e.g., Windows CE) with any unauthorized operating systems (e.g., Linux).

Figure 6:
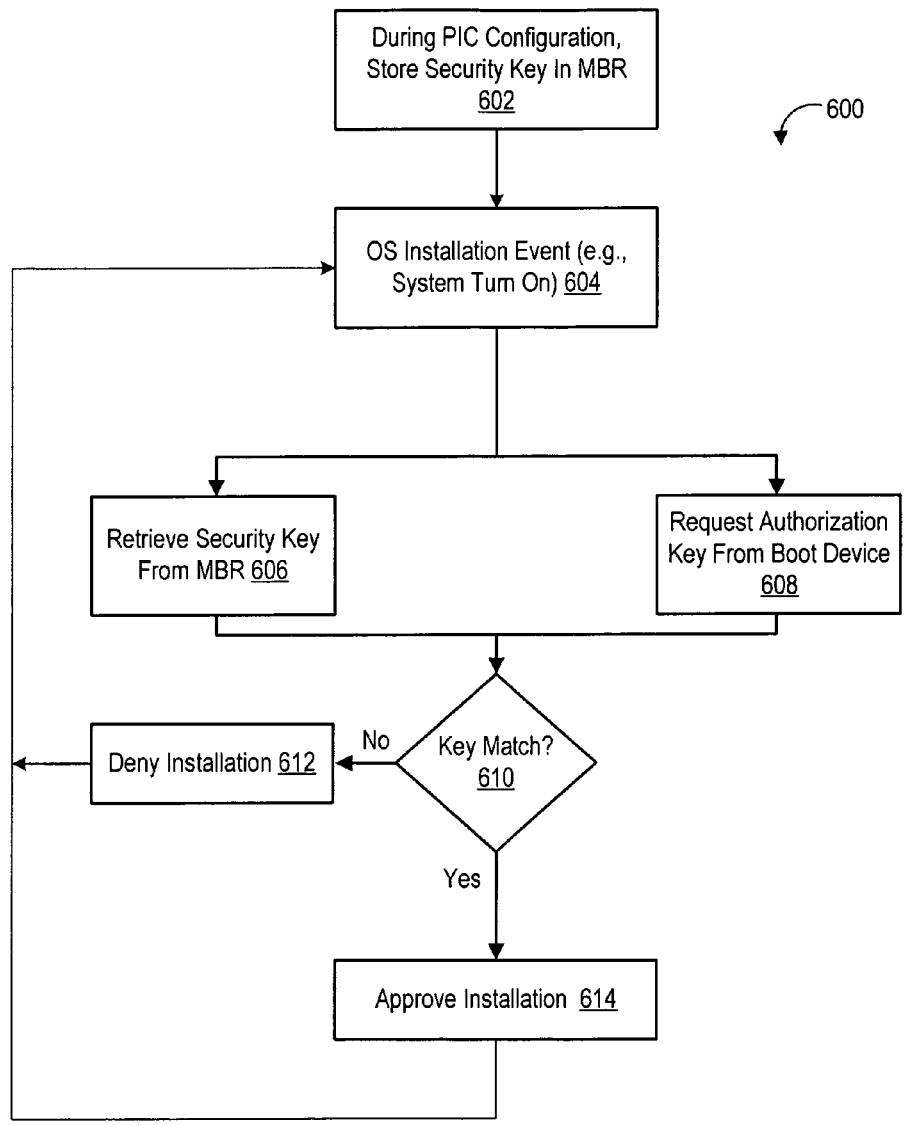
FIG. 6 shows a flow chart of the operation of a protection system for preventing unauthorized installation of operating system code and/or software on a computer system.

Turning now to FIG. 6, a flow chart is shown of the operation of a protection system for preventing unauthorized installation of operating system code and/or software on a computer system. As will be appreciated, the depicted system operations may be used to restrict installation of operating system and other software, whether during system startup or any other time when files are loaded or installed on the PIC 110. However, for the sake of simplicity, the present description focuses primarily on the restricting operating system installation during startup.

As a preliminary step 602, a security key is stored in the non-volatile memory of a computer system (e.g., PIC 110) to be protected. When an installation event occurs at step 604 (e.g., during system startup when a bootable device attempts to write operating system files to the hard drive), the security key is retrieved from the non-volatile memory (step 606). In addition, an authorization key is requested from the boot device (step 608). Though depicted as occurring in parallel, the key retrieval steps may instead occur in sequence.

Once the security key and authorization key are obtained, they are compared at step 610. If the keys do not match (negative outcome to decision 610), then the requested installation is denied and the system reverts back to step 604 to detect the next installation event. At this point, the next boot device in the list may be checked for a key and the process is restarted, but if no key is found on any boot device in the list, then the system halts and appears hung to the user. However, if the keys match (affirmative outcome to decision 610), then the requested installation is approved (step 614) and the system reverts back to step 604 to detect the next installation event. As will be appreciated, the foregoing steps may be implemented as part of the software update module or as part of the BIOS code.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A device comprising at least one non-transitory recordable storage medium having stored thereon executable instructions and data which, when executed by at least one processing device, cause the at least one processing device to perform the steps of:

detecting an installation request from a boot loader device;
   retrieving a security key from a non-volatile storage unit on the device in response to the installation request;
   requesting a first authorization signature key from the boot loader device;
   comparing the security key with the first authorization signature key;
   approving the installation request only if the security key matches the first signature authorization key; and
   checking a next boot loader device identified in a stored list for a second authorization key that matches the security key if the security key does not match the first authorization key.

2. The device of claim 1, where the non-volatile storage unit comprises a master boot record.

3. The device of claim 1, where the boot loader device comprises an internal BIOS memory unit.

4. The device of claim 1, where the boot loader device comprises an external bootable device.

5. The device of claim 1, where the recordable medium comprises an internal BIOS memory unit.

6. The device of claim 1, where the executable instructions and data are stored in the BIOS.

7. The device of claim 1, where the executable instructions and data are included in a software update module that is included in an installed operating system.

8. The device of claim 1, where the executable instructions and data further cause the at least one processing device to deny the installation request if the security key does not match the first authorization key.

\* \* \* \* \*